US007606158B2

(12) United States Patent  
Fedorkow et al.

(10) Patent No.: US 7,606,158 B2  
(45) Date of Patent: Oct. 20, 2009

(54) HIERARCHICAL FLOW CONTROL FOR ROUTER ATM INTERFACES

(75) Inventors: Guy C. Fedorkow, Bedford, MA (US); Kenneth H. Potter, Jr., Raleigh, NC (US); Mark A. Gustlin, Campbell, CA (US); Christopher J. Kappler, Waltham, MA (US); Robert T. Olsen, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 701 days.

(21) Appl. No.: 10/949,916

(22) Filed: Sep. 24, 2004

(65) Prior Publication Data

US 2006/0067225 A1    Mar. 30, 2006

(51) Int. Cl.
*H04J 1/16* (2006.01)

(52) U.S. Cl. ............... 370/235; 370/395.1; 370/395.41; 370/395.52

(58) Field of Classification Search .......... 370/235, 370/395.1, 395.52, 395.41, 412, 417, 418, 370/419, 429

See application file for complete search history.

(56) References Cited

U.S. PATENT DOCUMENTS

| | | | | |
|---|---|---|---|---|
| 5,390,176 | A * | 2/1995 | Schoute et al. ........... 370/395.7 |
| 6,219,351 | B1 * | 4/2001 | Kilkki ......................... 370/412 |
| 6,389,026 | B1 * | 5/2002 | Kozaki et al. ................ 370/398 |
| 6,522,667 | B1 | 2/2003 | Oda et al. .................... 370/474 |
| 6,535,513 | B1 * | 3/2003 | Kao et al. ................. 370/395.1 |
| 6,611,522 | B1 | 8/2003 | Zheng et al. ............ 370/395.21 |
| 6,618,378 | B1 | 9/2003 | Giroux et al. ............ 370/395.1 |
| 6,628,649 | B1 | 9/2003 | Raj et al. |
| 6,657,961 | B1 * | 12/2003 | Lauffenburger et al. ..... 370/231 |
| 6,792,002 | B2 * | 9/2004 | Tezuka et al. ................ 370/474 |
| 6,876,952 | B1 | 4/2005 | Kappler et al. |
| 6,909,720 | B1 | 6/2005 | Willis ..................... 370/395.52 |
| 7,023,856 | B1 * | 4/2006 | Washabaugh et al. .... 370/395.1 |
| 7,277,448 | B1 | 10/2007 | Long et al. |
| 2003/0043809 | A1 | 3/2003 | Kawakami et al. ....... 370/395.1 |

OTHER PUBLICATIONS

PCT International Search Report, mailed Feb. 5, 2007.
Written Opinion of the International Searching Authority, mailed Feb. 5, 2007.
Light Reading—Networking the Telecom Industry, "Car Pools & QOS", Jul. 22, 2004, 4 pages, http://www.lightreading.com/document.asp?doc_id=56635.
David Allan, Nortel Networks, David Thorne, BT, "Technical Report DSL Forum TR-059", "DSL Evolution—Architecture Requirements for the Support of QoS-Enabled IP Services", Sep. 2003, pp. 1-48.
Goss, Gregory S., et al., Methods and Apparatus for Maintaining a Queue, U.S. Appl. No. 10/411,172, filed Apr. 10, 2003.

(Continued)

*Primary Examiner*—Dady Chery
(74) *Attorney, Agent, or Firm*—BainwoodHuang

(57) ABSTRACT

Presently disclosed is an apparatus and method for returning control of bandwidth allocation and packet scheduling to the routing engine in a network communications device containing an ATM interface. Virtual circuit (VC) flow control is augmented by the addition of a second flow control feedback signal from each virtual path (VP). VP flow control is used to suspend scheduling of all VCs on a given VP when traffic has accumulated on enough VCs to keep the VP busy. A new packet segmenter is employed to segment traffic while preserving the first in, first out (FIFO) order in which packet traffic was received. Embodiments of the invention may be implemented using a two-level (per-VC and per-VP) scheduling hierarchy or may use as many levels of flow control feedback-derived scheduling as may be necessitated by multilevel scheduling hierarchies.

21 Claims, 8 Drawing Sheets

OTHER PUBLICATIONS

Kappler, Christopher J., et al., Methods and Apparatus for Reducing Arbitration Delay in Channelized Systems by Use of Additional Scheduling Heirarchy, U.S. Appl. No. 10/422,167, filed Apr. 24, 2003.

Kappler, Christopher J., et al., Methods and Apparatus for Scheduling Tasks, U.S. Appl. No. 10/446,597, filed May 28, 2003.

Goss, Gregory S., et al., Methods and Apparatus for Scheduling Operation of a Data Source, U.S. Appl. No. 10/446,981, filed May 28, 2003.

Smith, Scott C., et al., Iterative Architecture for Heirarchical Scheduling, U.S. Appl. No. 10/610,181, filed Jun. 30, 2003.

* cited by examiner

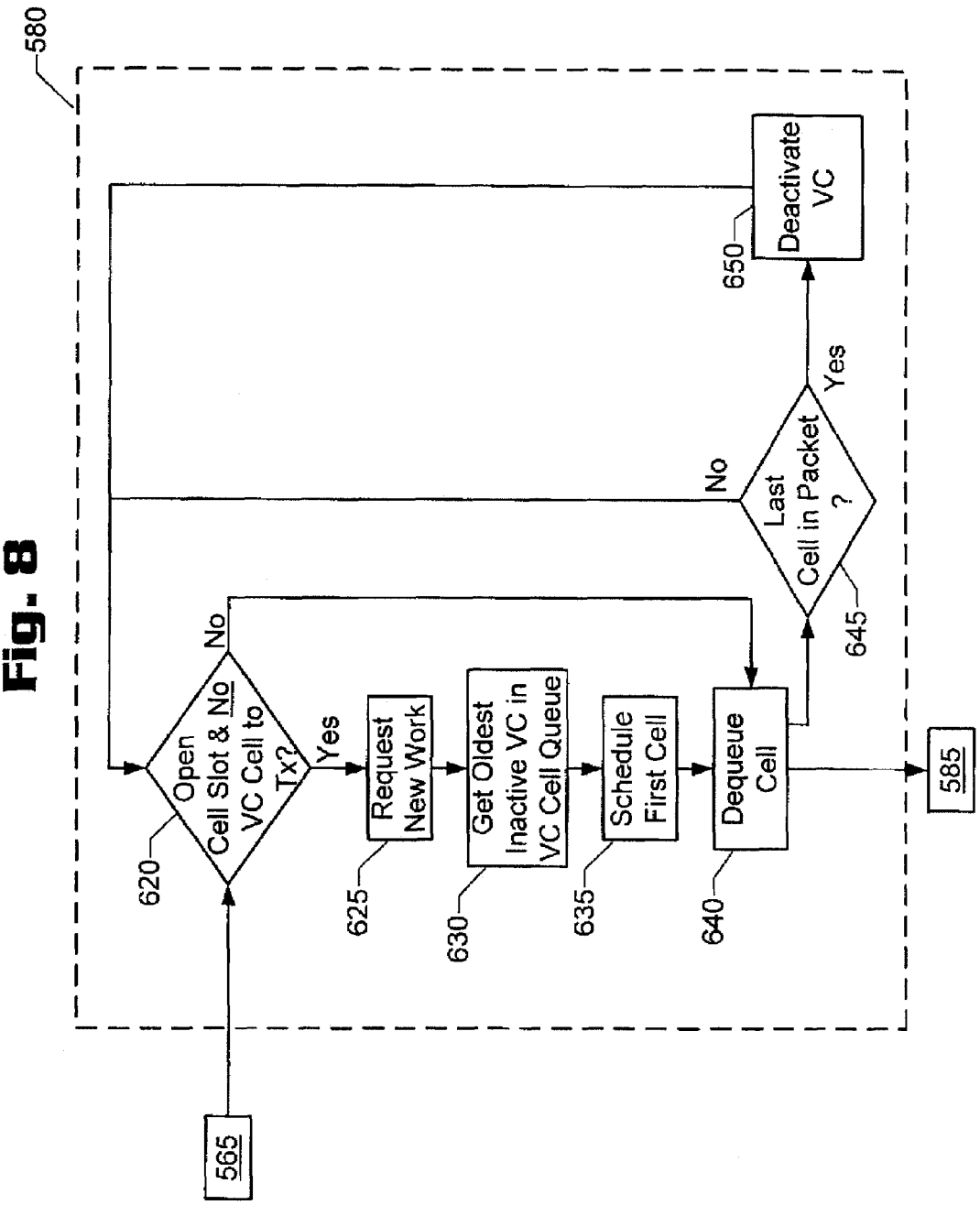

HIERARCHICAL FLOW CONTROL FOR ROUTER ATM INTERFACES

BACKGROUND

In the past, routers have often taken advantage of the rich set of quality of service (QoS) features offered by asynchronous transfer mode (ATM) to implement differentiated classes of service. As Internet Protocol-based QoS capabilities have matured, ATM QoS and Internet Protocol (IP) QoS are now often in conflict.

Internet Protocol QoS features are typically implemented within the routing engine portion of the router. Such QoS-maintaining schemes are also implemented at the packet level. ATM QoS features are usually implemented in ATM segmentation and reassembly (SAR) units, which are typically provided in the router linecards where the router connects to the ATM network. ATM QoS schemes are typically implemented at the ATM cell level, either during the conversion of packet data into cell data or on the cell data itself.

In the case of advanced IP QoS features, such as new packet prioritization features, traditional ATM QoS features often completely undo the router's traffic scheduling features by rescheduling traffic with ATM rules instead of IP rules.

Router vendors have typically used per-virtual circuit (per-VC) flow control to regulate the rate at which traffic is sent from the router routing engine to the ATM SAR device as part of the process of ensuring that the predefined amount of bandwidth is available for designated VC's. This approach effectively regulates the amount of traffic sent by the router (and thus insures the certain QoS), but does not allow the routing engine to control bandwidth allocation in the ATM network. When the linecard applies its conventional ATM bandwidth control mechanisms to the cell traffic, the resulting reordering of cells containing the packet data may result in an entirely different bandwidth allocation when considered at the packet level.

SUMMARY

In a router, switch, or other network communications device, flow control is typically sent from each egress interface back to the packet routing engine to regulate the amount of traffic that the routing engine sends to the interface. A common prior art technique sends flow control information for each individual virtual circuit (VC) from the egress interface to the packet engine. In cases where the egress interface is ATM, and the egress interface becomes congested, traffic will be enqueued on all VCs and the interface device (typically linecard or components within the linecard, such as the SAR) will use its ATM QoS policy to allocate bandwidth to individual VCs. As a result, the routing engine will no longer have control over bandwidth allocation. It is therefore desirable to provide a system and method for preserving packet QoS in the presence of ATM bandwidth allocation and congestion control.

Embodiments of the present invention provide two mechanisms, employed in concert, to return control of bandwidth allocation and packet scheduling to the routing engine. In the first mechanism, per-VC flow control is augmented by the addition of a second flow control feedback signal from each virtual path (VP) to the routing engine. VP flow control is used to suspend scheduling of all VCs on a given VP and is generated by the SAR when the SAR has accumulated traffic on enough VCs to keep the VP busy. The second mechanism is a new ATM segmenter that segments the packets in a designated VP while preserving the first in, first out (FIFO) order in which the traffic was received from the routing engine. Unlike a normal segmenter function, once the FIFO segmenter starts segmenting a packet, it will continue to segment that packet at either the peak or sustained cell rate (PCR or SCR) for that packet's VC until the packet is completely segmented. New packets will be started on other VCs on that virtual path only when there is spare bandwidth available.

Together, these two mechanisms insure that the routing engine retains its ability to send more traffic on VCs that are configured to receive additional bandwidth, either statically or dynamically. At the same time, the existing per-VC flow control that underlies conventional routing policy will prevent the routing engine from sending traffic faster than is allowed by ATM traffic classes.

Embodiments of the present invention may be implemented using a two-level (per-VC and per-VP) scheduling hierarchy when the virtual paths are not over-subscribed and hence not subject to congestion. This condition occurs when the sum of the bandwidth required by each virtual path in the interface is less than or equal to the total bandwidth available for the interface. Conversely, when the sum of the bandwidth required by all of the virtual paths in a given interface exceeds the available interface bandwidth, a third (or more) level or hierarchy of scheduling may be employed. Accordingly, such an implementation is not limited to only a two-level hierarchy but may use as many levels of flow control feedback-derived scheduling as may be necessitated by multilevel scheduling hierarchies. For example, and not by way of a limitation, the implementation may utilize an interface level flow control feedback signal to provide a QoS maintenance system to situations where both the VC's and the VPs are oversubscribed.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 8 is a flowchart depicting further details of the FIFO buffering process performed within linecard scheduling process 580 of FIG. 5, according to one embodiment of the present invention.

DETAILED DESCRIPTION

Embodiments of the present system and method are directed to techniques for hierarchical flow control in routers, switches, and other network communications devices that implement and preserve packet quality of service (QoS) controls while routing or switching packets into asynchronous transfer mode (ATM) networks. As used herein, the term "hierarchical" refers to the use of two or more nested tiers of flow control and associated queuing/dequeuing control mechanisms. While an embodiment using flow control signals based on packet hierarchy defined by the each packet's destination virtual circuit (VC) and virtual path (VP) characteristics is initially described, alternate embodiments using a hierarchy of three or more control levels are also possible within the scope of the present invention. For example, and discussed in further detail below, flow control may also be accomplished on a per-interface basis in addition to a per-VC/per-VP packet hierarchy.

Figure 1:
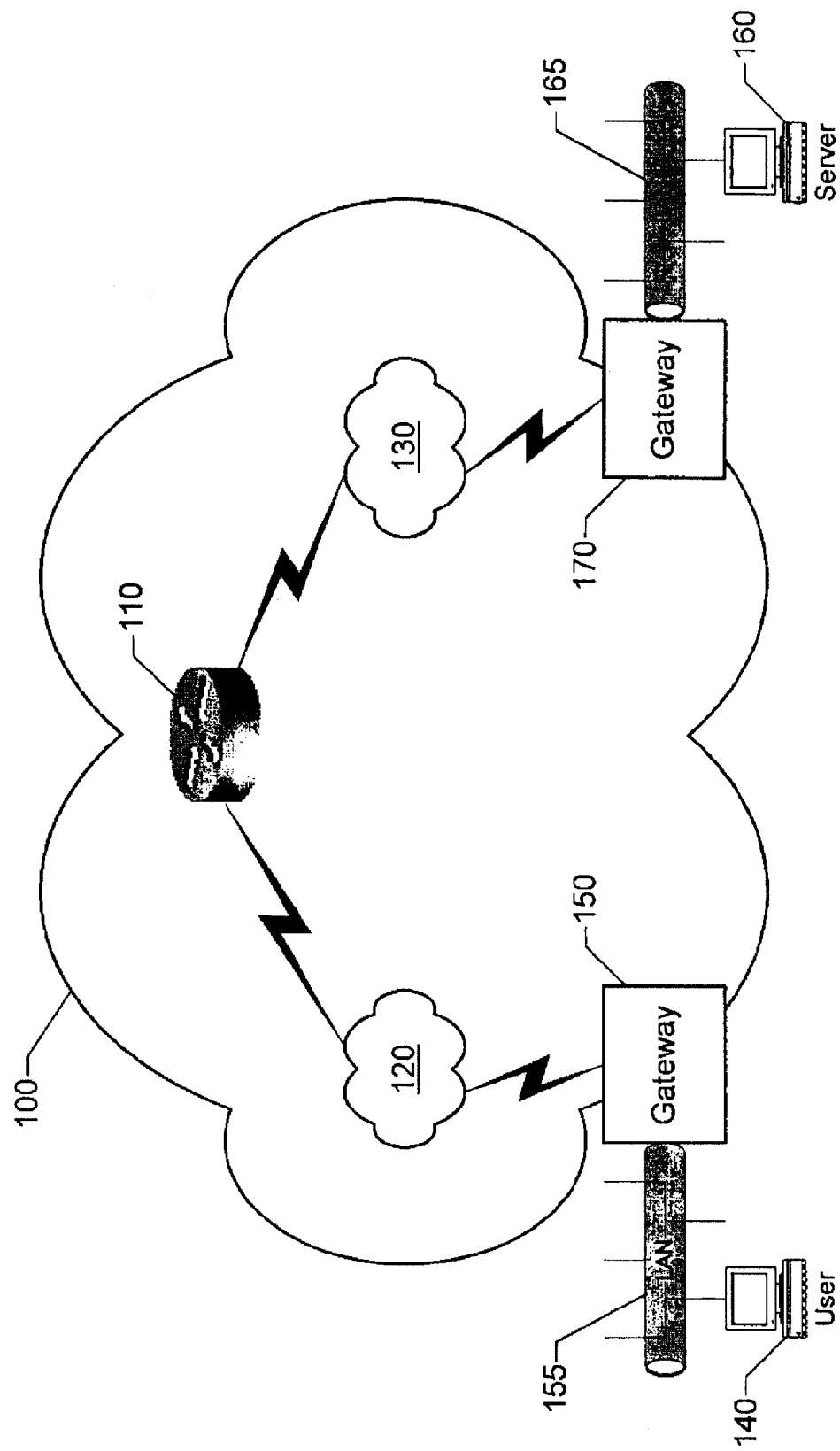
FIG. 1 is a high-level schematic diagram of a prior art wide area network (WAN) with a router conveying traffic between a packet network and an asynchronous transfer mode (ATM) network.

FIG. 1 is a high-level schematic diagram of a prior art wide area network (WAN) 100 with an access router 110 conveying traffic between a packet network 120 and an ATM network 130. For example, a typical user 140 may access packet network 120 through a local area network (LAN) 155 and a gateway 150. Gateway 150 may employ the TCP/IP protocol suite to convey data to and through packet network 120. In this example, this data is destined for server 160 on LAN 165 and, accordingly, it is routed through the access router 110 by ordinary means well-known in the art. As shown in FIG. 1, however, the path from access router 110 to gateway 170 passes through ATM network 130. Accordingly, access router 110 must "translate" the packet-formatted data received from packet network 120 into ATM cell-formatted data for transport over ATM network 130.

Access router 110 and gateways 150 and 170 may be any type of server, router, switch, or other network communications device or system connected to an access network. Likewise, packet network 120 may consist of any packet-protocol network connection employing any physical medium. For example, but not by way of limitation, network 120 may contain TCP/IP traffic carried over physical media supporting the Packet-over-SONET (POS) standards. ATM network 130 may consist of any ATM-protocol network connection employing any physical medium. For example, but not by way of limitation, network 130 may employ a synchronous optical network (SONET) or digital subscriber line (DSL) medium.

Although a particular network topology is described, those skilled in the art will realize that a network topology other than the gateway/access router topology described with respect to FIG. 1 can be used. Accordingly, embodiments of the invention are not limited to any particular network topology.

When packets arrive at access router 110 with a predetermined QoS, the unconstrained application of typical prior art ATM segmentation and scheduling rules will prevent the propagation of the desired packet QoS. It may even prevent the timely routing of the entire packet. In contrast, embodiments of the present invention are directed to systems and methods that provide translation of packet data into ATM cells with ATM-compliant flow control mechanisms that preserve packet QoS.

Figure 2:
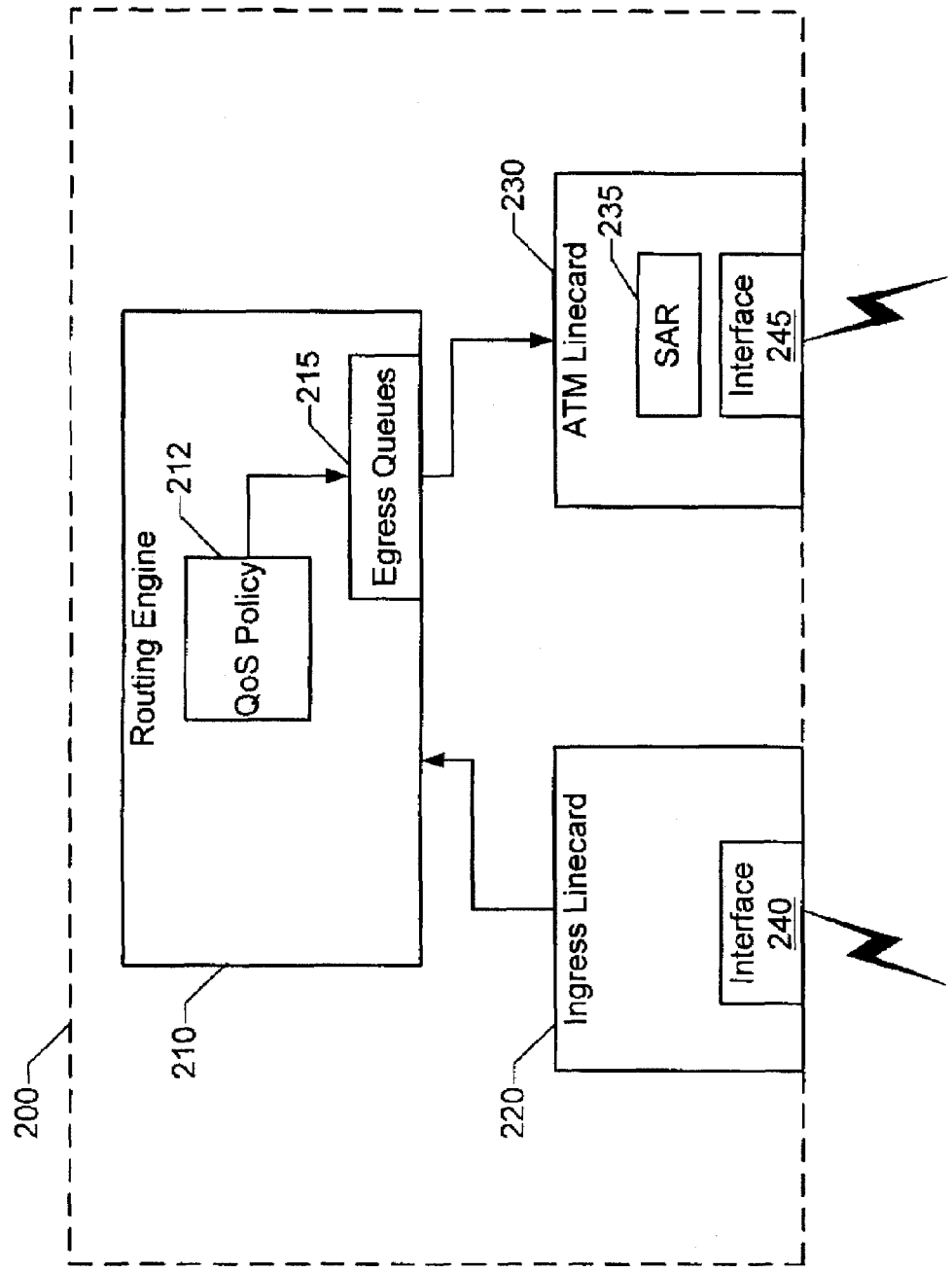
FIG. 2 is a high-level schematic diagram of certain elements of a router configured for routing packets with an ATM linecard, according to one embodiment of the present invention.

FIG. 2 is a high-level schematic diagram of selected portions of an access router 200 performing flow control while routing packets through an ATM linecard, according to one embodiment of the present invention. The access router 200 consists of, in some embodiments of the present invention, a routing engine 210 connected to an ingress linecard 220 and an egress linecard 230. In particular, ingress linecard 220 receives packet data from a TCP/IP network on interface 240. One of ordinary skill in the art will appreciate, however, that packet data on any physical media and employing any protocol may arrive at the ingress linecard via interface 240. (Such ingress linecard architectural options are well-known and not discussed further herein.) Likewise, many elements of the routing decision and packet processing in both the ingress linecard 220 and the routing engine 210 may also be accomplished through conventional means.

Routing engine 210 sends packets to the appropriate output interface 245 by enqueuing them in egress queuing structure (also referred to as "queues") 215. Queuing structure 215 typically consists of a plurality of memory elements configured as buffers for the temporary storage of packet data. Generally, when the egress linecard 230 is ready to receive packets, and according to the dictates of conventional scheduling (also referred to herein as "dequeuing") algorithms, packets are forwarded from routing engine 210 to linecard 230 through the router's internal connections (e.g., via the backplane).

Of particular interest is the case where linecard 230 provides an interface to an ATM network. In that case (depicted in FIG. 2), linecard 230 includes (among other elements) a segmentation and reassembly (SAR) unit 235, which may also be referred to as a "packet segmenter." SAR unit 235 "translates" packets into ATM cells by segmenting packets and adding ATM cell overhead bytes, according to conventional techniques, prior to transmitting the newly-formed cells into the ATM network through interface 245. (For inbound cells arriving at interface 245 from the ATM network, SAR unit 235 reassembles packets from the cell data prior to forwarding the packets to the routing engine 210. In such cases, the ATM linecard 230 acts as an ingress linecard.)

Also of interest is the relationship between the routing engine's QoS policy processing "module" or function 212 and its egress queues 215, which are discussed in further detail below. While routing engine 210 does not necessarily have a separate "module" (e.g., a physically distinct device or structure) dedicated to enforcing QoS policy, a QoS policy function 212 is illustrated in FIG. 2 to show its influence on both the filling (enqueuing) and emptying (dequeuing) of egress queues 215.

Figure 3:
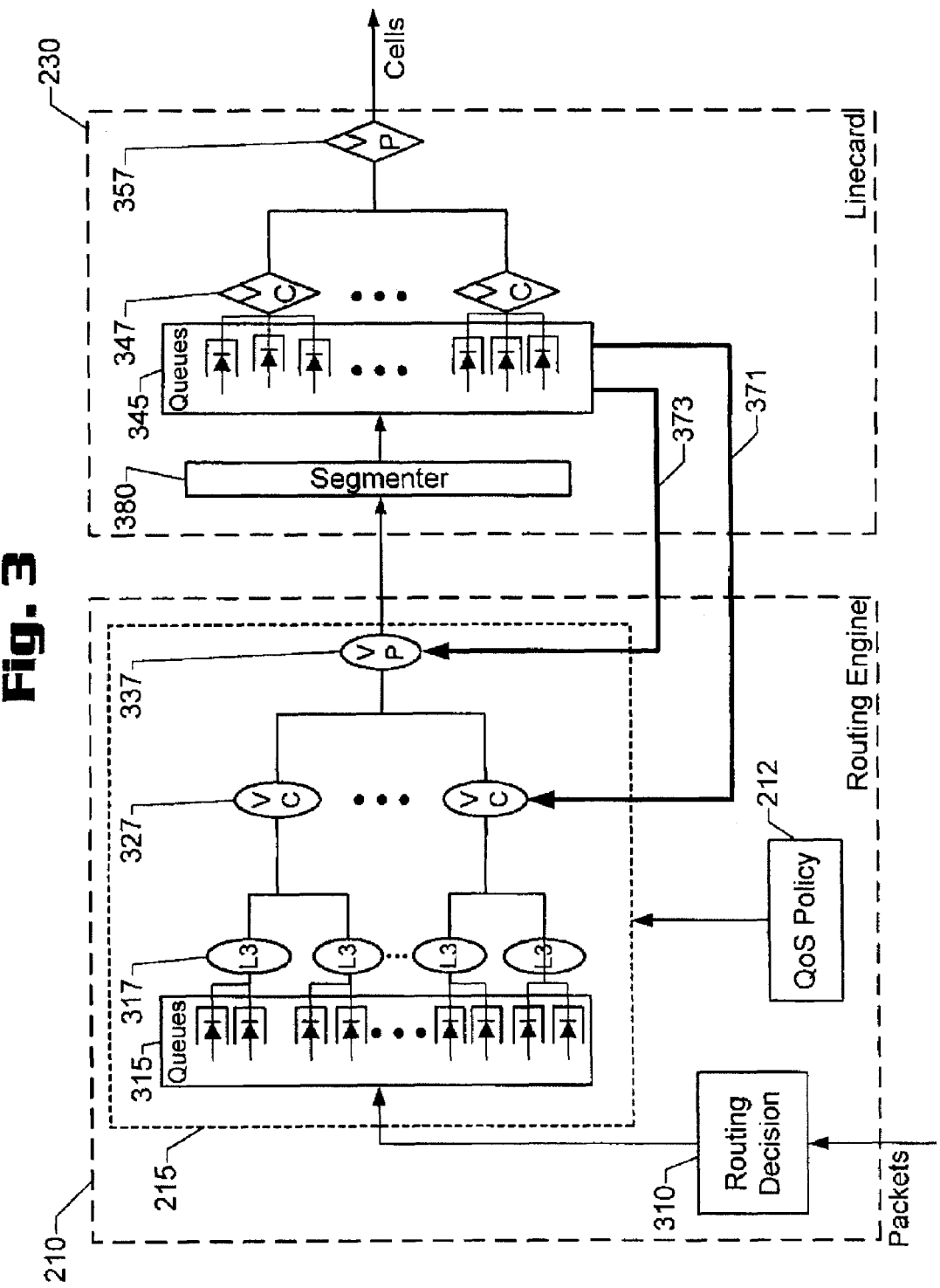
FIG. 3 is a high-level schematic representation of selected routing engine and linecard elements of the access router depicted in FIG. 2.

FIG. 3 is a high-level schematic representation of selected routing engine and linecard elements of the access router 200 illustrated in FIG. 2. In particular, FIG. 2 shows further details of routing engine 210, linecard 230, and their flow control interactions.

After packet data arrives from physical interface 240 on ingress linecard 220 (referring to FIG. 2), the routing decision is made by conventional hardware and/or software means represented by module 310. The modified packet (now containing new routing information) is then passed to egress queues 215.

Enqueuing and dequeuing functions performed within egress queues 215 proceed as follows. Represented at a high level, egress queues 215 may be thought of as including multiple, hierarchical dequeuing or scheduling stages. Represented schematically in FIG. 3, queuing stage 315 provides the actual packet buffers. (The memory structures, conventionally implemented in hardware and/or software, which provide the physical storage of the enqueued packets are not shown in order to enhance clarity.) Hierarchical packet schedulers 317, 327, and 337 dequeue packets. Initially, queuing (or "enqueuing") stage 315 provides conventional layer 3 (L3) packet enqueuing as is commonly found in routers today. Packets are placed into one of several queues determined in part by the QoS policy function 212 and packet classification (or simply "packet class") according to conventional techniques. In general, this queuing (and other basic queuing functions discussed in further detail below) may be accomplished through any of a number of well-known queuing algorithms used in the routing arts.

Although eight queues are shown, those skilled in the art will realize that any number of queue structures, and queues in any form (hardware or software) may be used according to the needs and capacity of the system. Accordingly, embodiments of the invention are not limited to any particular number or type of queue structures. Furthermore, the identification or classification of each packet according to the VC or VP it is destined for is accomplished through conventional means not germane to the present invention. Similarly, the classification of a packet into a QoS-denoting "class" may also be accomplished through conventional means. Accordingly, these classification techniques are not further discussed herein; embodiments of the invention are also not limited to any particular classification scheme or algorithm.

Packets are dequeued by the hierarchical packet scheduler function represented by ovals 317, 327, and 337; i.e., ovals 317, 327, and 337 represent scheduler elements that are arranged hierarchically to select which queue (within the set of queues 315) is allowed to send next. Note that scheduler ovals 317, 327, and 337 do not actually depict data transport elements. Functionally, the hierarchical schedulers know what is in the queues, and they know the rules for deciding which queue is to send next, but they do not pass packets from one level to another. Rather, hierarchical schedulers 317, 327, and 337 act as decision elements gating the dequeuing of packets from egress queues 215.

In general, packet schedulers 317, 327, and 337 (of which only a few are shown for illustration purposes only and not by way of limitation) dequeue packets from each queue according to the dictates of a scheduling algorithm, which may include various forms of congestion control and bandwidth sharing techniques. Examples of congestion control and bandwidth sharing techniques may include, but are not limited to, the weighted random early detection (WRED) and round-robin algorithms. Exemplary embodiments of the present invention include hierarchical scheduling functions as well. Although production software code for hierarchical packet scheduling algorithms may be very complicated, conceptually such schedulers perform the following high-level steps:

A. In one pass from leaf to root (i.e., considering the left side of routing engine 210 containing the queues 315 as the leaves and the right side containing the interface to linecard 230 as the root), the system first determines which levels of the hierarchy actually have traffic available to send. So, for instance, schedulers 317 must first determine which class queues have traffic to contribute to each VC. Any VC that has no traffic waiting in any of the class queues with which it is associated drops out of the scheduling pass. Similarly, each VP has a series of VCs associated with it; if none of its VCs have traffic ready to send, as determined in the previous step, then that VP drops out of the schedule.

B. Next, the scheduler makes a pass in the opposite direction, from root (the exit point from routing engine 210 towards linecard 230) to leaf (packet queues 315). Knowing which VPs could contribute traffic, scheduler 337 selects the best VP. Then, knowing which VCs in that VP could contribute traffic, scheduler 327 selects the best VC. Knowing that, scheduler 317 selects the best class within the chosen VC. At that point, the process has selected a packet to dequeue from queues 315 and send out the interface to linecard 230.

C. Then the system does it all again (i.e., it loops) to schedule dequeuing of the next packet.

Although separate scheduler functions 317, 327, and 337 are described, those skilled in the art will realize that these functions may be combined into one or several circuits or software modules. More or less schedulers 317, 327, and 337 may be employed depending on the number of VC or VP queues needed. The determination of the number of schedulers or scheduling functions necessary is well within the skill of an ordinary practitioner. Accordingly, embodiments of the invention are not limited to any particular type or organization of hardware and/or software modules for performing scheduling functions.

Hierarchical flow control (feedback) signals from linecard 230 are fed into the leaf-to-root scheduler pass at the appropriate level of the hierarchy. So when a VC is flow-controlled (i.e., the VC flow control signal 371 is asserted and further traffic is blocked), that VC is required to report itself as "empty" or unable to send when the VC-level scheduler 327 is figuring out if any VCs are candidates for transmission. Similarly, an asserted flow control signal received at the VP level disqualifies that VP, no matter how many VCs it may have ready for transmission.

In conventional nomenclature, a flow control signal that is set or asserted is often labeled "XOFF," indicating the further transmissions should be stopped. When flow congestion has abated, the flow control signal (on de-assertion) is typically labeled "XON." In other words, if the ATM linecard's per-VC queue is full (or has reached a predetermined fullness threshold), flow control 371 will be asserted (XOFF) and the VC schedulers 327 will not schedule the current packet. (The generation of VC and VP flow control signals is further discussed below.)

Enqueuing stage 315 may also be, in some embodiments, influenced or controlled by QoS policy function 212. This influence may take the form of causing packets of varying quality of service guarantee (or priority) levels to be enqueued at different levels, hierarchically, in queues 315 in order to maintain the desired QoS for the packet.

On arrival in ATM linecard 230, packets are time-stamped and segmented into conventional ATM cells based on (among other factors) their virtual path, virtual circuit, and packet priority and/or desired QoS. This process is accomplished, in some embodiments of the invention, in packet segmenter 380, discussed in further detail below with reference to FIG. 4.

Segmenter 380 takes packets and puts them into cell queue structure (or cell queues) 345. Cell queue structure 345 consists of a plurality of memory elements arranged as cell buffers configured to provide temporary storage of cell data. Each cell queue in structure 345 is associated with a VC. Cell scheduler blocks 347 and 357 perform a similar dequeuing task to that described above (with respect to routing engine schedulers 327 and 337) to decide which ATM cells to dequeue and transmit, although different scheduling policies may be used. In one exemplary embodiment, segmenter 380, cell queues 345, and cell schedulers 347 and 357 are implemented as part of the segmentation and reassembly function provided in the linecard. Alternatively, these functions may be implemented separately or in any combination of modules and/or software elements operating on packets arriving from the routing engine. The term "cell scheduler" as used herein refers to the scheduling and dequeuing functions (including flow control signal generation) implemented in the ATM network-facing element of the router. This term is used for illustrative clarity only and does not indicate or imply any limitation on the placement, organization, or implementation of these functions in systems built or operated according to embodiments of the present invention.

In the prior art, if the cell schedulers in the linecard have a different view of which traffic is more important than the routing engine's schedulers, then the traffic will sit in the linecard's queues instead of being sent out as the routing engine intended. The present invention's flow control and FIFO elements prevent the cell schedulers from getting in the way.

ATM cells may be enqueued in enqueuing stage 345 based on their corresponding virtual circuit. As the queue for each virtual circuit is filled, enqueuing stage 345 monitors the number of cells in each per-VC queue (i.e., the cell buffers' fill level characteristics) and compares that number to a predefined, per-VC threshold. If the number of cells in a queue reaches or exceeds the threshold, enqueuing stage 345 generates VC flow control signal 371 (i.e., asserts XOFF specific to a particular virtual circuit) and passes that signal back to routing engine 210. Likewise (although with a more complicated algorithm), the queue status for each virtual path is also monitored and VP flow control signal 373 asserted when too much of a given virtual path's bandwidth is demanded. The generation of the flow control signals 371 and 373 are discussed in detail below with respect to FIG. 4.

Although six ATM cell queues are shown in enqueuing stage 345, those skilled in the art will realize that any number of queue structures, and queues in any form (hardware or software) may be used according to the needs and capacity of the system. Accordingly, embodiments of the invention are not limited to any particular type or number of cell queue structures.

Cells are dequeued from queues 345 by cell scheduler functions 347 and 357, discussed in further detail below with respect to FIG. 4. Generally speaking, there is one VP scheduler 357 per interface and one VC scheduler 347 per VP. In a typical configuration, one might have 100 VPs and 20,000 VCs.

Although separate cell scheduler functions 347 and 357 are described, those skilled in the art will realize that these functions may be combined into one or several circuits or software modules. More or less cell schedulers 347 and 357 may be employed depending on the number of VPS and interfaces needed. The determination of the number of cell schedulers or scheduling functions necessary is well within the skill of an ordinary practitioner. Accordingly, embodiments of the invention are not limited to any particular type or organization of hardware and/or software modules for performing cell scheduling functions.

Figure 4:
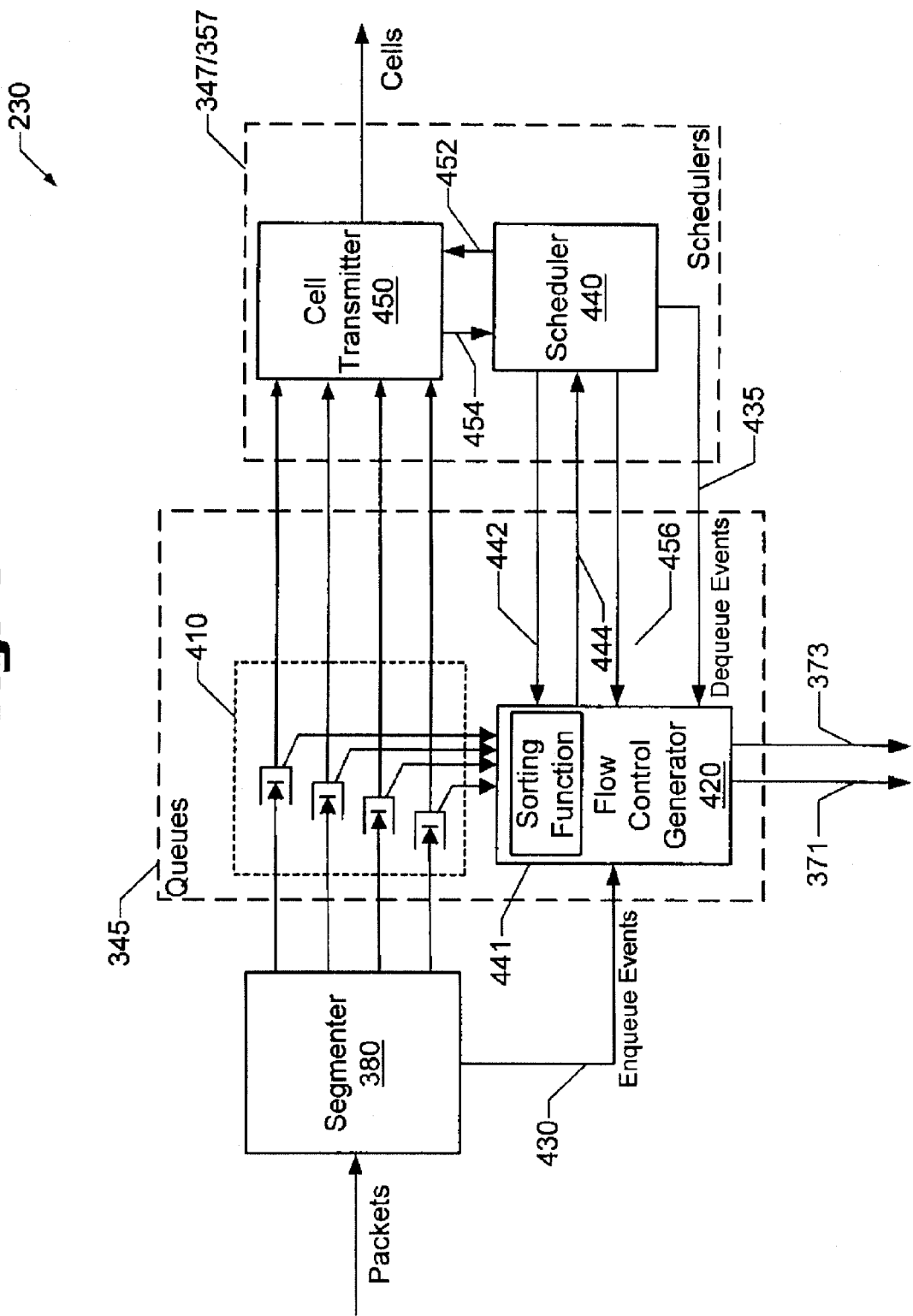
FIG. 4 is a high-level schematic representation of selected elements of a flow control feedback signal generator apparatus, according to one embodiment of the present invention.

FIG. 4 illustrates the functions of linecard 230 in greater detail, including elements of the flow control feedback signal generation provided therein, according to one embodiment of the present invention.

As noted above, linecard 230 includes, in some embodiments of the invention, segmenter 380, cell queuing stage 345, and schedulers 347 and 357. The general functions of major units 380 and 345 were discussed above with respect to FIG. 3; the following paragraphs discuss cell queuing stage 345 and the scheduling/transmitting functions embodied in cell schedulers 347 and 357 in further detail.

Packets may arrive in linecard 230 from router engine 210 on a conventional router backplane/linecard or any other interface (not shown). Segmenter 380 converts each packet into cells and enqueues the cells in queuing stage 345. For each enqueue, segmenter 380 signals flow control generator 420 that it is adding a cell to a queue and provides the VC and VP numbers to which the cell belongs via enqueue event signal 430. Segmenter 380 also adds a timestamp to each packet. The packet timestamp at the head of each VC queue (if any packets are present) is reported to a sorting function within flow control generator 420.

Enqueuing stage 345 consists of cell queues 410 and flow control generator 420. Cell queues 410, of which only four are shown for illustrative clarity and not by way of limitation, may consist of conventional queue structures known and used for ATM cell buffering today. Flow control generator 420 provides individual queue fill level monitoring and comparison to predetermined flow control thresholds in order to generate VC and VP flow control signals 371 and 373. (Flow control generator 420 is discussed in further detail below.)

While single flow control signals 371 and 373 are shown in FIG. 4, this depiction is presented solely for illustrative clarity. As discussed above, an individual XON/XOFF signal is presented to routing engine 210 for each VP and VC. This presentation may take the form of individual signals on separate wires or following separate paths to routing engine 210. Alternatively, the flow control signals may be conveyed to routing engine 210 in a multiplexed form on a single wire or other communications path. Such variations in conveying a plurality of signals are well within the skill of an ordinary practitioner in the arts and are not further detailed herein.

Scheduler 440 causes cells to be dequeued (at least in part) according to ATM scheduling rules and sends the cells out the ATM network interface (e.g., interface 245 in FIG. 2) via cell transmitter 450. Scheduler 440 may include, in some implementations, a FIFO scheduler (discussed further below with respect to FIG. 8) or one of a variety of standard cell schedulers. For each dequeue, scheduler 440 also signals the flow control generator 420 with the VC and VP numbers for the cell just dequeued via dequeue event signal 435.

Scheduler 440 schedules both VPs and VCs. In a prior art ATM linecard, the VP scheduler is generally not too complicated, simply allocating bandwidth to non-oversubscribed VPs using (for example) a simple weighted round robin algorithm. The more important scheduling action there takes place in the VC scheduler. The ordinary policy in the prior art would be to use a weighted scheduler for selecting the correct VC on a given VP, perhaps considering ATM traffic class as well (e.g., round-robin scheduling within the Variable Bit Rate–Non Real Time [VBR–nrt] or Unspecified Bit Rate [UBR]+Peak Cell Rate [PCR] classes). This kind of scheduler typically allocates the available bandwidth "fairly" among the VCs, causing all VCs to slow down equally under congestion.

In exemplary embodiments of the present invention, by contrast, scheduler 440 uses the packet/cell timestamp to encourage the linecard to send older traffic first, in preference to traffic that might have just arrived at the linecard, i.e., "First in, first out" or FIFO. This might not result in "fair" bandwidth allocation, but that is the point of the invention: the ATM linecard should not have a vote in what is fair, the routing engine alone should decide.

Scheduler 440 causes cells to be transmitted (via cell transmitter 450) from a VC in queues 410 no faster than the individual VC's pre-determined peak cell rate (PCR). Whenever scheduler 440 has an open cell transmission slot and the PCR limits prevent any of the currently-active VCs from being scheduled, scheduler 440 signals a sorting function 441 within flow control generator 420 (via new work request signal 442) that it needs new work, i.e., a packet from a currently-inactive VC in queues 410. Sorting function 441 then sorts all of the VCs that are not already in scheduler 440's "active" list to find a VC that is not currently active, with traffic ready to go and having the oldest time stamp going first, thus providing a FIFO transmit capability. The selected VC is added to scheduler 440's transmit list via the new VC identifier signal 444.

When scheduler 440 selects a VC for transmission, it signals cell transmitter 450 via cell transmit token signal 452. Cell transmit token signal 452 allows cell transmitter 450 to dequeue one cell from the appropriate VC queue 410 and transmit it to the ATM interface (not shown).

Cell transmitter 450 indicates to scheduler 440 when a cell it has transmitted is the last cell of a packet with last cell indicator 454. Once scheduler 440 has sent the last cell of a packet from a VC and enough time has elapsed to accommodate the PCR of that VC, scheduler 440 removes the VC from the schedule and signals sorting function 441 that the VC has become inactive via inactive VC identifier signal 456.

Flow control generator 420 generates VC flow control signal 371 as follows:

A. Maintain a set of queue-depth counters, one for each VC. These counters are represented as an array indexed by VC number, e.g., "VC_Q_Depth[vc]."

B. For each enqueue, increment a queue-depth counter corresponding to the VC number.

C. For each dequeue, decrement the corresponding VC queue-depth counter.

D. If the queue-depth counter exceeds a programmable threshold, generate XOFF flow control signal 371 for that VC. If the queue-depth counter falls below a (possibly different) programmable threshold, generate the XON signal for that VC (also presented on signal 371).

Flow control generator 420 also generates VP flow control signal 373. Thus, to ensure there is "enough" traffic enqueued in the SAR to keep the VP busy, flow control generator 420 must compute the per-VP threshold on the basis of the amount of traffic that is actually eligible for transmission during a window equal to the period of time it takes for the routing engine to refill traffic on the VCs (referred to herein as the "refill window"). The amount that a single VC contributes to the aggregate is the count of bytes (cells) in the VC's queue that will be eligible during the refill window. This is essentially the VC's queue depth, up to a maximum determined by the VC's PCR. This maximum is calculated as the product of the VP's flow-off threshold (i.e., refill window size) scaled by the fraction of that window which can be satisfied by the VC running at its PCR. This fraction is the VC's Peak Cell Rate divided by the rate of the VP. The aggregate VP "fill level", called Eligible_VP_Traffic, is thus computed as follows:

```
For (i = 0 to max_vc) {
    Eligible_VP_Traffic += min(VC_Q_Depth[i], VP_Watermark *
        PCR[i]/VP_Rate);
}
```

If the result of the calculation, Eligible_VP_Traffic, exceeds the threshold VP_Watermark, then flow-off (XOFF) is asserted for the VP, because the active VCs have sufficient eligible traffic to keep the VP utilized during the refill window.

What this says is that each time a cell is received from the host and added to the pool of queues by the enqueue process, or each time a cell is removed from a queue by the dequeue process, the process re-evaluates the equation above for each VP. So the "For (i=0 to max_vc)" iterator covers all of the VCs in a particular VP, and looks at all the counters for all the VCs that make up that VP. The process repeats the calculation for the next VP by iterating over the next group of VCs that makes up the next VP, and so on.

This conceptual algorithm may be somewhat inefficient in an actual implementation with thousands of VCs. An "incremental" algorithm, where one keeps a running total of "Eligible_VP_Traffic" and updates it with each enqueue and dequeue, rather than calculating it all over again from scratch, is therefore preferable. The following describes such an algorithm using pseudo-code. Implementation of such an incremental algorithm in hardware and/or software, including some combination of both, is well-within the skill of an ordinary practitioner and would not require undue experimentation.

The incremental algorithm works as follows. First, in a control system that samples VP under-commitment and over-commitment once per-VP flow control (FC) interval, one can define the following variables:

| | | |
|---|---|---|
| PCR_VP | (cells/sec) | |
| host_VP_shaped_rate | (cells/sec) | (overspeed for VP shaping problem) |
| VP_FC_interval_s | (sec) | |
| VP_FC_interval_c | (cells) | = PCR_VP*VP_FC_interval |
| VP_cong_window_s | (sec) | = 2*VP_FC_interval |
| VP_cong_window_c | (cells) | = 2*VP_FC_interval_c |
| VP_overshoot | (cells) | = (host_VP_shaped_rate − PCR_VP)*VP_FC_interval + leakage |
| PCR_VC[i] | (cells/sec) | |
| PCR_VC_c[i] | (cells) | = PCR_VC[i]* VP_cong_window_s |
| VC_qdepth[i] | (cells) | |
| VP_commitment | (cells) | = Sum(active vcs) + min( PCR_VC_c[i], VC_qdepth[i] ) |

We define the congestion window as twice (2×) the flow control interval in order to sample VP commitment twice per window. When a packet arrives at the linecard, VP_commitment is conditionally increased.

```
enq_vc(i) {
    VP_commitment  −= min( PCR_VC_c[i], VC_qdepth[i] )
    VC_qdepth[i]   += packet size (cells)
    VP_commitment  += min( PCR_VC_c[i], VC_qdepth[i] )
}
enq_vc(i) {
```

When a cell is transmitted from the VP, the VP_commitment is conditionally decreased.

```
deq_vc(i) {
    VP_commitment  −= min( PCR_VC_c[i], VC_qdepth[i] )
    VC_qdepth[i]   −= 1
    VP_commitment  += min( PCR_VC_c[i], VC_qdepth[i] )
}
```

Note that, due to the "min" function, these operations may have no net change on the commitment values.

Then, at flow control (FC) sample time:

Xoff=VP_commitment>VP_cong_window_c

It is straightforward for one skilled in the art to extend the equations above to accommodate multiple levels of priority in the flow control signaling. This would be done, for L levels of priority, by tracking L instances of VC_qdepth and L instances of VP_commitment where the commitment at a lower level of priority is a superset of the commitment at the higher levels of priority.

Since the queue depths are used, there is no long term error growth; the incremental algorithm acts somewhat like a credit scheme. For example, assume that all packets are one cell. This scheme will ask the host to keep VP_cong_window_c VCs active all the time. The host will initially activate VP_cong_window_c+VP_overshoot VCs. Then an XOFF will be sent to the host. During one FC interval, the VP_commitment will drop to VP_FC_interval_c+VP_overshoot and as many VCs will be active.

When (VP_overshoot/VP_FC_interval_c) flow control intervals pass, the following condition will hold and XON will be sent:

VP_cong_window_c/
2<=VP_commitment<=VP_cong_window_c

So, with one cell per VC, there is a strict upper bound and a strict lower bound on how many VCs will be active if all VCs are sending one cell packets. The lower bound reduces to one as PCRs increase and as packet sizes increase. Again, assuming one cell packets:

VP_FC_interval_c<=active
VCs<=VP_cong_window_c+VP_overshoot.

When we consider high priority traffic, there could be another factor of two on the upper bound, i.e., (2*VP_cong_window_c)+VP_overshoot. As the PCRs of the VCs increase to approach PCR_VP, and as the average packet size increases to approach VP_FC_interval_c, as few as two VCs may be active at one time.

The fact that the number of active VCs is bounded on both sides should prevent under-run on the lower bound and should prevent VCs from getting less than about PCR_VC[i]/const_X due to the upper bound. Calculating const_X requires consideration of VP_overshoot.

const_X=2+VP_overshoot/VP_FC_interval_c

The "2" term above is from the twice flow control window (2×FC) oversampling of the congestion. If the host is shaping the VP to 2*PCR_VP, then const_X=3. This essentially gives each VC a minimum cell rate (MCR) of PCR_VC[i]/3 during the active periods of the VC on the SAR.

One of ordinary skill in the art will recognize that the above described functions (and the processes described below) all operate simultaneously, in parallel, on successive packets and cells in the stream of data routed by the system. Accordingly, while the methods of the present invention are described with reference to flowcharts showing discrete steps for illustrative clarity, embodiments of the invention are not so limited.

Figure 5:
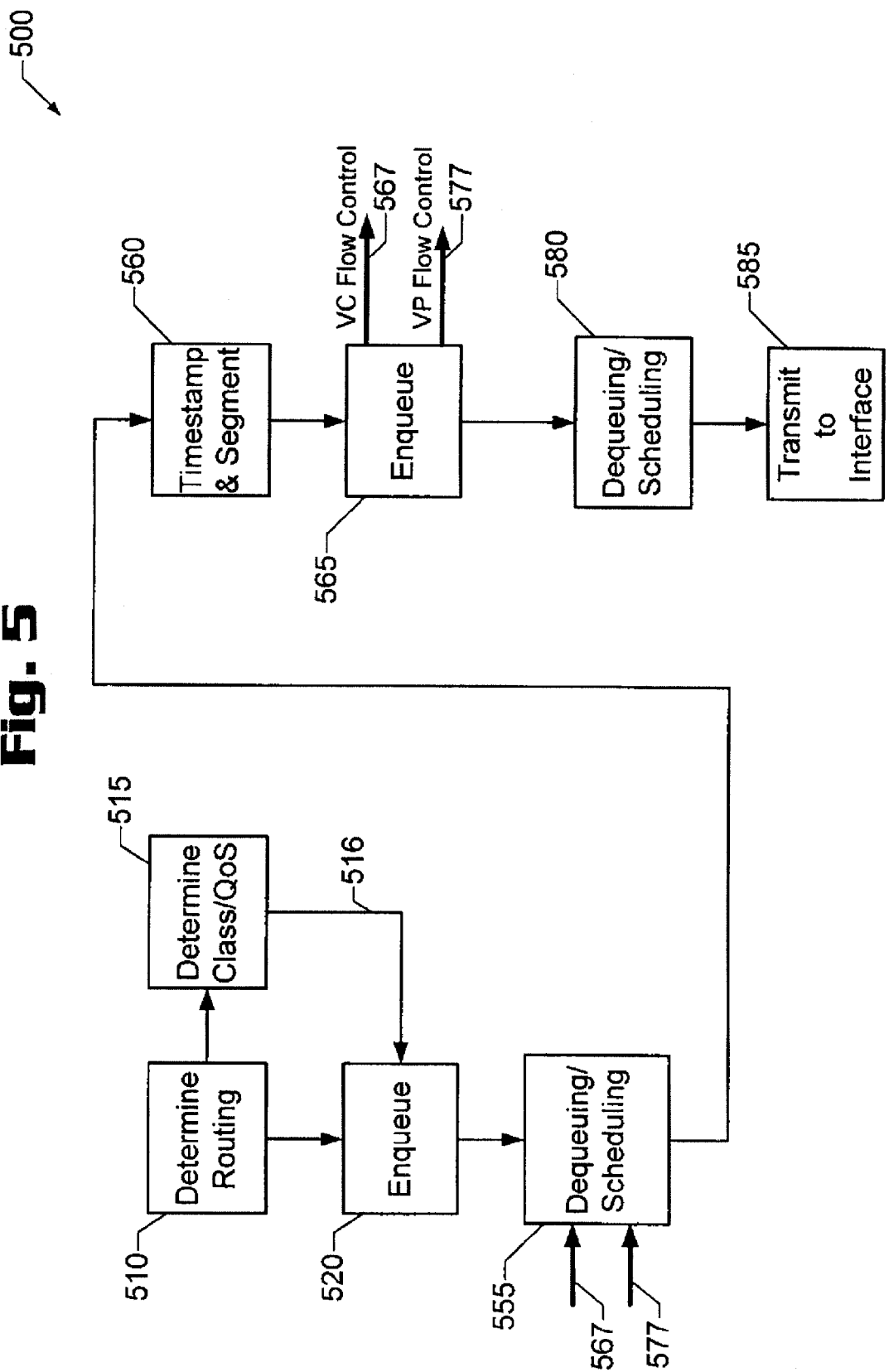
FIG. 5 is a flowchart of the hierarchical per-virtual circuit/per-virtual path flow control method according to one embodiment of the present invention.

FIG. 5 is a high-level flowchart of the hierarchical per-VC/per-VP flow control method of the present invention. In step 510, process 500 determines the routing necessary for each packet through conventional processes. At substantially the same time, shown by step 515, process 500 also determines the packet classification and quality of service/priority required by that packet. Each packet is enqueued in step 520 based at least in part on its classification. The term "classification," as used here, refers generally to the conventional process of determining packet priority and desired QoS. In some embodiments, packet priority may be classified based on the layer 3 (L3) routing information associated with the packet. One of ordinary skill in the art will readily appreciate the classification based on any or all of a number of packet classification parameters currently in use today (or yet to be identified) is equally possible and valid. Accordingly, embodiments of the invention are not limited to any particular type of classification-based enqueuing in step 520.

The queues are emptied through dequeuing/scheduling step 555. Prior to scheduling each packet for dequeuing, process 500 checks to see if a VC flow control signal 567 (i.e., an XON/OFF signal) for the current packet's VC has been asserted. If the VC flow control signal 567 has been asserted (XOFF is true), the VC is considered "full" and process 500 will not schedule the current packet. If, however, no flow control 567 is asserted (XON is true), the packet is scheduled for dequeuing. Likewise, process 500 also checks to see if a VP flow control signal 577 has been asserted for the current packet's corresponding VP. If the VP flow control signal 577 is asserted (XOFF is true), the virtual path is considered "full" and the current packet will not be scheduled. Routing engine dequeuing/scheduling step 555 is explained in further detail with respect to FIG. 6 below.

To begin processing into ATM cells, packets are first time stamped and segmented according to conventional packet-to-ATM cell conversion techniques in step 560. Each cell is then enqueued in step 565. Step 565 continuously monitors each virtual circuit to ascertain whether the number of cells enqueued for each virtual circuit is below a predetermined, queue-specific threshold level. In the event that a VC's fill level exceeds its preset threshold, VC enqueuing step 565 asserts VC flow control signal 567, which is passed to and tested in step 555. Likewise, step 565 also continuously monitors the fill level characteristic of each virtual path, asserting VP flow control signal 577 when its threshold is exceeded. Cell-based enqueuing and flow control signal generation step 565 is explained in further detail with respect to FIG. 7 below.

Cells are removed from each linecard queue by dequeuing/scheduling step 580 and transferred to the ATM physical interface circuits in step 585. Cell-based dequeuing/scheduling step 580 is explained in further detail with respect to FIG. 7 below.

Figure 6:
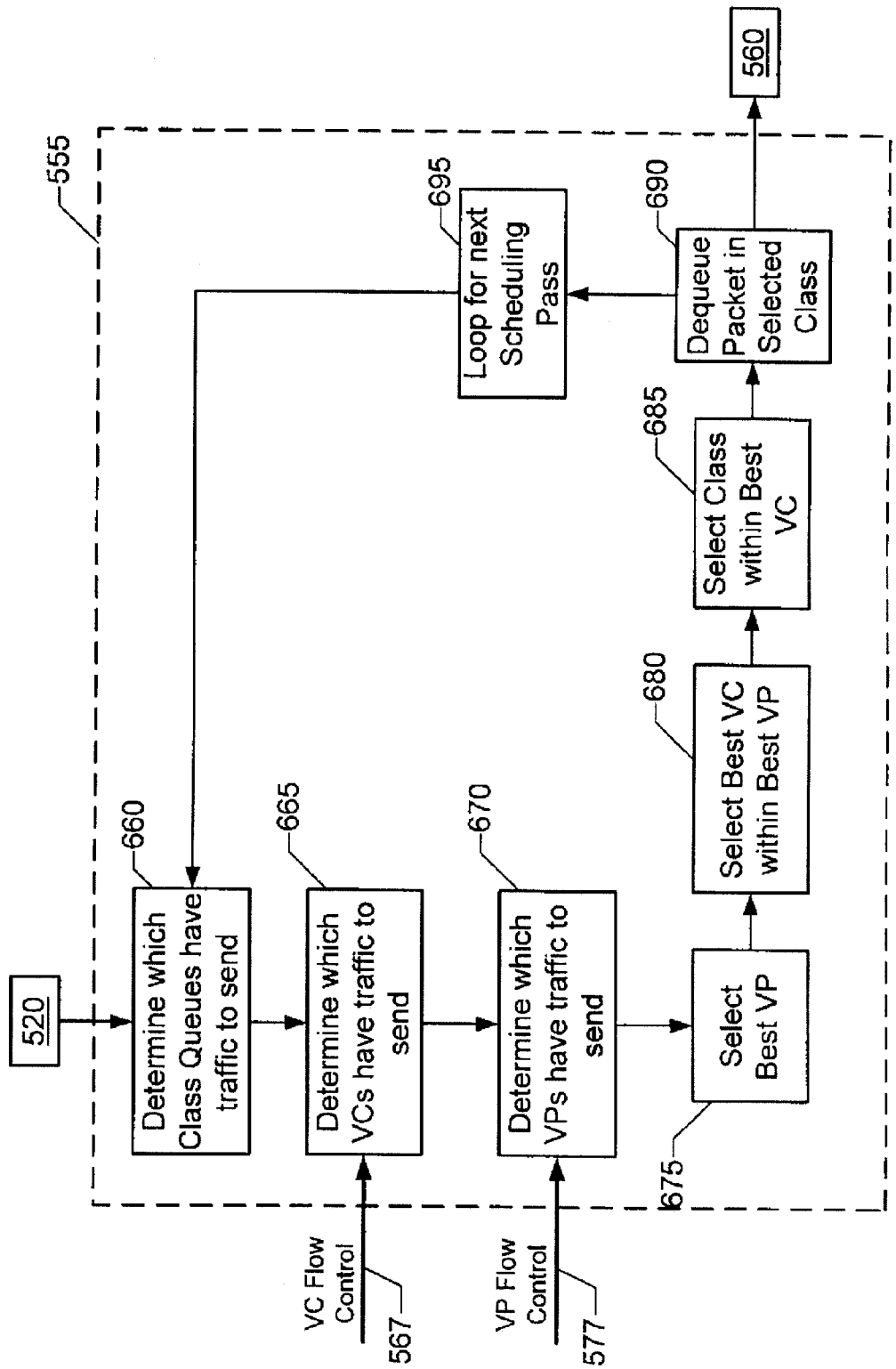
FIG. 6 is a flowchart depicting further details of the routing engine dequeuing/scheduling process 555 depicted in FIG. 5, according to one embodiment of the present invention.

FIG. 6 illustrates step 555 of process 500 (referring to FIG. 5) in greater detail. Specifically, FIG. 6 is a high-level flowchart of the packet scheduling process performed to dequeue packets from the packet queues prior to transmission to the ATM linecard functions. Step 660 first determines which class queues have traffic to send. Next, in step 665 the process 555 determines which virtual circuits have traffic to send. This determination 665 is subject to (i.e., contingent on) the non-assertion of VC flow control signal 567. If VC flow control signal 567 is asserted, i.e., XOFF is signaled, then the current VC will be prohibited from scheduling any packets for dequeuing until VC flow control signal 567 is de-asserted.

Process 555 next determines which virtual paths have traffic to send in step 670. This determination is also contingent on the non-assertion of VP flow control signal 577. Again, if VP flow control signal 577 is asserted, then step 670 will not schedule any packets from the current VP for dequeuing until VP flow control signal 577 is de-asserted.

Once the VPs, VCs, and classes ready to send traffic have been determined, step 675 selects the best VP (i.e., the VP of all of VPs ready to send that has the highest priority or most-urgent QoS characteristics). Process 555 next selects the best VC within the selected VP in step 680, according to similar criteria. Finally, the process selects the highest-priority class within the best VC in step 685 and dequeues all of the packets in that class in step 690. The dequeued packets are then typically sent to the ATM-network interface function (for example, but not limited to, the functions provided by the ATM linecard discussed above) for translation into ATM cells in further processing.

Process 555 then loops, in step 695, to update its determinations 660,665, and 670 of which traffic is ready to send and to select the next best VP, VC, and class as determined in steps 675 through 685 for dequeuing.

Figure 7:
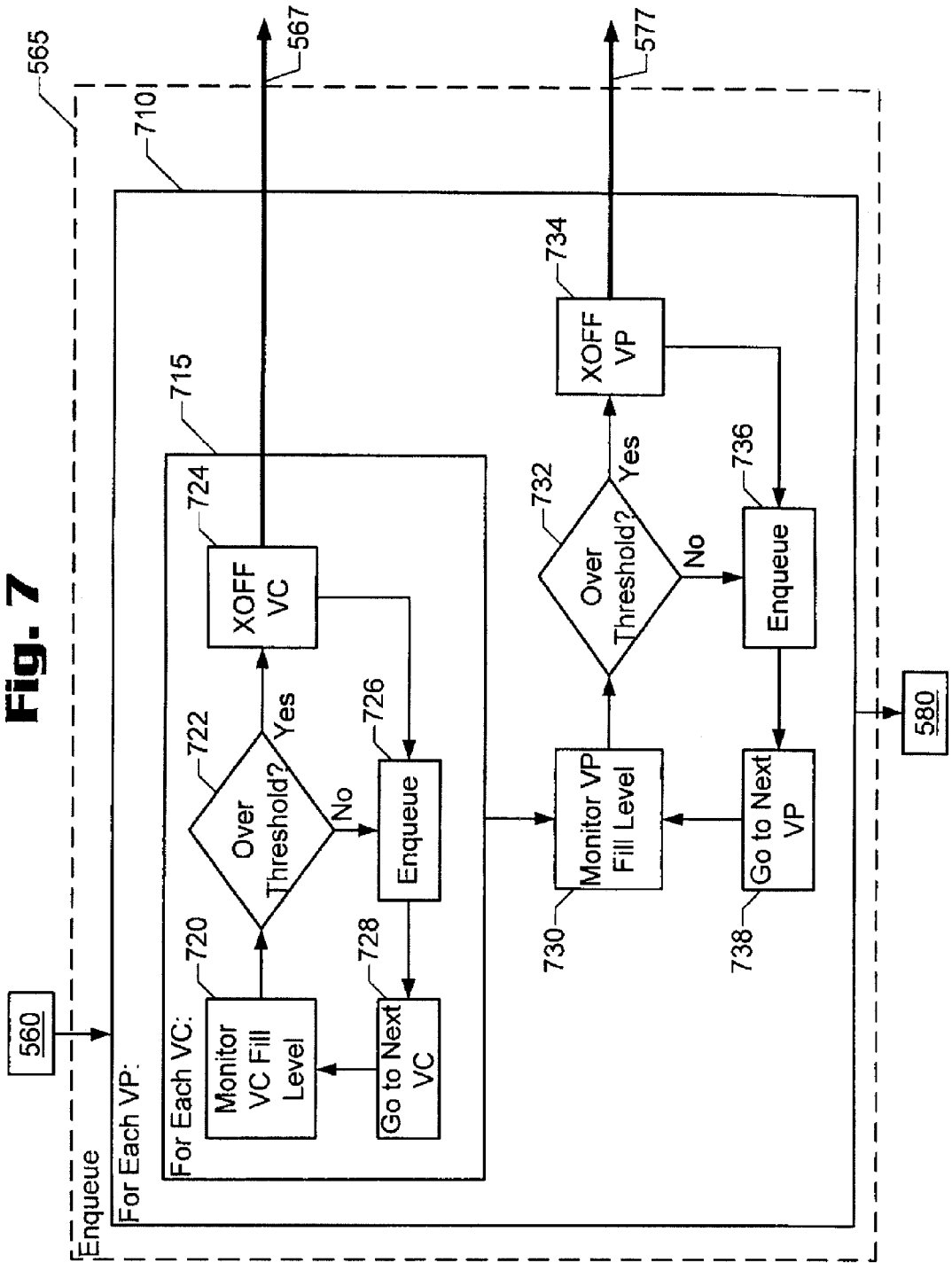
FIG. 7 is a flowchart depicting further details of the flow control signal generation process performed within linecard enqueuing process 565 of FIG. 5, according to one embodiment of the present invention.

FIG. 7 is a high-level flowchart of selected aspects of the flow control feedback signal generation process according to one embodiment of the present invention. In particular, FIG. 7 illustrates the subprocesses underlying per-VC enqueuing step 565.

While the actual enqueuing in cell buffers may be accomplished, in some embodiment of the present invention, by conventional means, the generation of VC and VP flow control signal 567 and 577, respectively, must be accomplished in iterative fashion for each VC and for each VP containing each VC. Accordingly, process 565 operates in the nested fashion illustrated at a high-level by FIG. 7. Per-VC processing step 715 is itself an iterative process that conceptually begins by monitoring the fill level characteristic for each virtual circuit in step 720.

The term "fill level characteristic" as used herein refers to the amount of traffic associated with each virtual circuit or virtual path. As a practical matter, the capacity of each virtual circuit and virtual path to carry data is limited by both the physical aspects of the ATM network interface as well as router and network policy. Accordingly, there is a limit beyond which additional traffic cannot be carried in either structure. The network state where excess demand for either virtual circuit or virtual path bandwidth exists is referred to as "over subscription;" embodiments of the invention attempt to overcome over subscription of both VCs and VPs with hierarchical flow control.

The VC fill level characteristic is compared to a predetermined threshold in step 722 and, if the fill level exceeds the threshold, VC flow control signal 567 (e.g., XOFF) is asserted in step 724. The cell is then enqueued normally in step 726 and per-VC enqueuing process 715 loops (at step 728) to monitor VC fill level for the next VC. All VCs are continuously monitored in a round-robin fashion by process 715.

At substantially the same time, the fill level characteristics of the virtual paths are monitored in step 730. The virtual path fill level characteristics are compared to a predetermined threshold in step 732. If fill level exceeds the threshold, VP flow control signal 577 (e.g., XOFF) is asserted in step 734.

All of the cells and virtual circuits in the current VP are enqueued in step 736. The per-VP enqueuing process 710 loops back to step 730 to continue to monitor VP fill level for the next VP. As with the VCs, all VPs are continuously monitored in a round-robin fashion by process 710.

FIG. 8 illustrates aspects of step 580 in process 500 in greater detail, including the first in, first-out (FIFO) cell scheduling features according to one embodiment of the present invention.

Cells arrive from timestamp and segmenter step 560 and are placed in cell queues by enqueue step 565, referring back to FIG. 5. Operating essentially independently of enqueuing step 565, dequeuing/scheduling subprocess 580 proceeds by first testing (in step 620) to see if there is an open cell slot (in the ATM frame) on which to transmit the VC and if there is no currently-active VC cell to transmit. If so, subprocess 580 requests new work (i.e., the activation of a new VC and identification of the first cell to process) in step 625.

The new work request generated in step 625 activates step 630, which determines the oldest (based on cell timestamp), inactive VC among all of the current VC's and identifies that VC and its first cell to subprocess 580. Subprocess 580, in step 635, schedules the first cell associated with the newly-activated VC for dequeuing in step 640. The dequeued cell is then passed to transmit step 585 (shown in FIG. 5) for transmission into the ATM interface.

Test 645 determines, for each dequeue cell, whether the net cell contains the end of the packet to be transmitted for that virtual circuit. If so, the VC is deactivated in step 650 (thus removing the virtual circuit from consideration by the scheduler as an "active" VC). Subprocess 580 then loops back to test 620 to dequeue the next cell in the current VC. One of ordinary skill in the arts will readily appreciate that dequeuing subprocess 580 may be performed on many VCs in parallel, thus enabling rapid cell throughput.

Alternate Embodiments

As noted above, the number of queue structures and the number and type of scheduling functions provided for packet and cell processing (i.e., both in the routing engine and in the linecard) is not limited by the foregoing disclosure. Embodiments of the invention encompass queuing and dequeuing hierarchies beyond those employing only packet classification, per-VC, and per-VP hierarchical levels. Any number of hierarchical levels may be accommodated through modification and adaptation of the scheduling algorithms disclosed herein; such adaptation may be easily performed by one of ordinary skill in the art according to the teachings of this specification. In particular, a four-level hierarchy consisting of class, VC, VP, and interface may also be provided in accordance with embodiments of the present invention. In such an embodiment, interface-level congestion is analyzed and used to generate a third flow control signal to shut off or enable packets destined for a particular interface as determined by the measured congestion at that interface. Further extension to additional levels of hierarchy is also possible. Accordingly, embodiments of the invention are to be understood as not limited by the specific examples of hierarchical levels contained herein.

The order in which the steps of the present method are performed is purely illustrative in nature. In fact, the steps can be performed in any order or in parallel, unless otherwise indicated by the present disclosure.

The method of the present invention may be performed in hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Accordingly, embodiments of the invention are not limited to any particular platform, unless specifically stated otherwise in the present disclosure.

While this invention has been particularly shown and described with references to embodiments thereof, it will be understood by those skilled in the art that various changes in form and details may be made therein without departing from the spirit and scope of the invention as defined by the appended claims.

We claim:

1. A method of flow control in a network communications device, said network communications device receiving packets, comprising:

enqueuing said packets in one or more packet queue structures of said network communications device;
scheduling, in said network communications device, said packets for dequeuing from said one or more packet queue structures according to a packet hierarchy;
dequeuing said packets, in said network communications device;
segmenting, in said network communications device, each said dequeued packet into one or more ATM cells;
enqueuing said ATM cells into one or more cell queue structures of said network communications device;
scheduling, in said network communications device, said ATM cells for dequeuing from said one or more cell queue structures according to said packet hierarchy; and
transmitting said ATM cells through an ATM interface of said network communications device;

wherein:
said dequeuing said packets is controlled by the presence or absence of one or more feedback signals from said cell queue structures;
said scheduling said ATM cells for dequeuing from said one or more cell queue structures employs a first in, first-out buffer; and
dequeuing said packets includes:
determining which packet queue structures contain a packet ready for dequeuing;
determining which virtual circuits of a plurality of virtual circuits, each virtual circuit being associated with one cell queue structure and with a plurality of packet queue structures, have available capacity with reference to a feedback signal from the cell queue structure associated with the virtual circuit; and
causing to be dequeued a packet from a packet queue structure associated with a virtual circuit having available capacity and having a highest virtual circuit priority, the particular packet queue structure being the packet queue structure containing a packet ready for dequeuing having the highest priority, as assigned by a Quality of Service policy function.

2. The method of claim 1, wherein said network communications device is a router.

3. The method of claim 1, wherein said network communications device is a switch.

4. The method of claim 1, wherein said packet hierarchy is determined at least in part by a virtual circuit characteristic and a virtual path characteristic of each said packet.

5. The method of claim 4, wherein said packet hierarchy is determined at least in part by an interface characteristic of each said packet.

6. The method of claim 1, wherein at least one of said feedback signals is generated with an incremental algorithm.

7. An apparatus for flow control in a network communications device, said network communications device receiving a plurality of packets, comprising:
a packet queue structure disposed to receive said plurality of packets and comprising a plurality of packet buffers;
a packet scheduler, operably connected to said packet queue structure, configured to dequeue each packet in said plurality of packets from said packet queue structure based on a packet hierarchy;
a packet segmenter disposed to receive said dequeued packets and configured to segment each said dequeued packet into ATM cells;
a cell queue structure operably connected to and receiving said ATM cells from said packet segmenter comprising a plurality of cell buffers, said cell buffers having a fill level characteristic;
a cell scheduler, operably connected to said cell queue structure, configured to dequeue said ATM cells from said cell queue structure based on said packet hierarchy, said cell scheduler comprising a first in, first-out (FIFO) module configured to schedule cells belonging to each said packet for dequeuing, preferentially in the order in which said cells were received; and
feedback circuit disposed between and operably connected to said cell scheduler and said packet queue structure and configured to provide one or more feedback signals corresponding to said packet hierarchy to said packet queue structure;

wherein:
said feedback circuit is controlled at least in part by said fill level characteristic of said cell buffers;
said one or more feedback signals are based on said virtual circuit characteristics and said virtual path characteristics of said plurality of packets; and
the packet scheduler is configured to dequeue each packet from said packet queue structure based on a packet hierarchy by:
determining which packet buffers contain a packet ready for dequeuing;
determining which virtual circuits of a plurality of virtual circuits, each virtual circuit being associated with one cell queue buffer and with a plurality of packet buffers, have available capacity with reference to a feedback signal from the cell buffer associated with the virtual circuit; and
causing to be dequeued a packet from a packet buffer associated with a virtual circuit having available capacity and having a highest virtual circuit priority, the particular packet buffer being the packet buffer containing a packet ready for dequeuing having the highest priority, as assigned by a Quality of Service policy function.

8. The apparatus of claim 7, wherein said network communications device is a router.

9. The apparatus of claim 7, wherein said network communications device is a switch.

10. The apparatus of claim 7, wherein said packet hierarchy is determined at least in part by a virtual circuit characteristic and a virtual path characteristic of each said packet.

11. The apparatus of claim 10, wherein said packet hierarchy is determined at least in part by an interface characteristic of each said packet.

12. The apparatus of claim 7, wherein said feedback circuit employs an incremental algorithm to generate one or more feedback signals.

13. A computer-readable medium storing a computer program executable by a network communications device, the computer program comprising computer instructions for:
enqueuing said packets in one or more packet queue structures;
scheduling said packets for dequeuing from said one or more packet queue structures according to a packet hierarchy;
dequeuing said packets;
segmenting each said dequeued packet into one or more ATM cells;
enqueuing said ATM cells into one or more cell queue structures;
scheduling said ATM cells for dequeuing from said one or more cell queue structures according to said packet hierarchy; and
transmitting said ATM cells through an ATM interface;

wherein:
said dequeuing said packets is controlled by the presence or absence of one or more feedback signals from said cell queue structures;

said scheduling said ATM cells for dequeuing from said one or more cell queue structures employs a first in, first-out buffer; and the computer instructions for dequeuing said packets include computer instructions for:
  determining for each virtual circuit of a plurality of virtual circuits, each virtual circuit being associated with one cell queue structure, if the particular virtual circuit has available capacity with reference to a feedback signal from the cell queue structure associated with the virtual circuit;
  determining for each virtual path of a plurality of virtual paths, each virtual path being associated with a plurality of virtual circuits, if the particular virtual path has available capacity with reference to feedback signals from the cell queue structures associated with the virtual circuits associated with the virtual path;
  determining which virtual path with available capacity has a highest virtual path priority;
  determining which virtual circuit associated with the virtual path with highest virtual path priority has the highest virtual circuit priority, said virtual circuit being the working virtual circuit; and
  causing to be dequeued a packet from a packet queue structure of a plurality of packet queue structures associated with the working virtual circuit, the particular packet queue structure being the packet queue structure having the highest priority, as assigned by a Quality of Service policy function, of the plurality of packet queue structures, the dequeued packet being associated with the working virtual circuit.

14. The computer-readable medium of claim 1, wherein said packet hierarchy is determined at least in part by a virtual circuit characteristic and a virtual path characteristic of each said packet.

15. The computer-readable medium of claim 1, wherein at least one of said feedback signals is generated with an incremental algorithm.

16. The computer-readable medium of claim 13 wherein:
the computer instructions for enqueuing said ATM cells into one or more cell queue structures include computer instructions for:
  timestamping a first cell associated with the dequeued packet; and
  for each cell associated with the dequeued packet, placing said cell in the cell queue structure associated with the working virtual circuit of the dequeued packet.

17. A method of flow control in a network communications device, said network communications device receiving packets, comprising:
  enqueuing said packets in one or more packet queue structures of said network communications device;
  scheduling, in said network communications device, said packets for dequeuing from said one or more packet queue structures according to a packet hierarchy;
  dequeuing said packets, in said network communications device;
  segmenting, in said network communications device, each said dequeued packet into one or more ATM cells;
  enqueuing said ATM cells into one or more cell queue structures of said network communications device;
  scheduling, in said network communications device, said ATM cells for dequeuing from said one or more cell queue structures according to said packet hierarchy; and
  transmitting said ATM cells through an ATM interface of said network communications device;

wherein said dequeuing said packets is controlled by the presence or absence of one or more feedback signals from said cell queue structures;

wherein said scheduling said ATM cells for dequeuing from said one or more cell queue structures employs a first in, first-out buffer; and wherein:
  dequeuing said packets includes:
    determining for each virtual circuit of a plurality of virtual circuits, each virtual circuit being associated with one cell queue structure, if the particular virtual circuit has available capacity with reference to a feedback signal from the cell queue structure associated with the virtual circuit;
    determining for each virtual path of a plurality of virtual paths, each virtual path being associated with a plurality of virtual circuits, if the particular virtual path has available capacity with reference to feedback signals from the cell queue structures associated with the virtual circuits associated with the virtual path;
    determining which virtual path with available capacity has a highest virtual path priority;
    determining which virtual circuit associated with the virtual path with highest virtual path priority has the highest virtual circuit priority, said virtual circuit being the working virtual circuit; and
    causing to be dequeued a packet from a packet queue structure of a plurality of packet queue structures associated with the working virtual circuit, the particular packet queue structure being the packet queue structure having the highest priority, as assigned by a Quality of Service policy function, of the plurality of packet queue structures, the dequeued packet being associated with the working virtual circuit.

18. The method of claim 17 wherein:
enqueuing said ATM cells into one or more cell queue structures includes:
  timestamping a first cell associated with the dequeued packet; and
  for each cell associated with the dequeued packet, placing said cell in the cell queue structure associated with the working virtual circuit of the dequeued packet.

19. An apparatus for flow control in a network communications device, said network communications device receiving a plurality of packets, comprising:
  a packet queue structure disposed to receive said plurality of packets and comprising a plurality of packet buffers;
  a packet scheduler, operably connected to said packet queue structure, configured to dequeue each packet in said plurality of packets from said packet queue structure based on a packet hierarchy;
  a packet segmenter disposed to receive said dequeued packets and configured to segment each said dequeued packet into ATM cells;
  a cell queue structure operably connected to and receiving said ATM cells from said packet segmenter comprising a plurality of cell buffers, said cell buffers having a fill level characteristic;
  a cell scheduler, operably connected to said cell queue structure, configured to dequeue said ATM cells from said cell queue structure based on said packet hierarchy, said cell scheduler comprising a first in, first-out (FIFO) module configured to schedule cells belonging to each said packet for dequeuing, preferentially in the order in which said cells were received; and
  feedback circuit disposed between and operably connected to said cell scheduler and said packet queue structure and configured to provide one or more feedback signals corresponding to said packet hierarchy to said packet queue structure;

wherein:
said feedback circuit is controlled at least in part by said fill level characteristic of said cell buffers;
said one or more feedback signals are based on said virtual circuit characteristics and said virtual path characteristics of said plurality of packets; and
the packet scheduler is configured to dequeue each packet from said packet queue structure based on a packet hierarchy by:
determining for each virtual circuit of a plurality of virtual circuits, each virtual circuit being associated with one cell buffer, if the particular virtual circuit has available capacity with reference to a feedback signal from the cell buffer associated with the virtual circuit;
determining for each virtual path of a plurality of virtual paths, each virtual path being associated with a plurality of virtual circuits, if the particular virtual path has available capacity with reference to feedback signals from the cell buffers associated with the virtual circuits associated with the virtual path;
determining which virtual path with available capacity has a highest virtual path priority;
determining which virtual circuit associated with the virtual path with highest virtual path priority has the highest virtual circuit priority, said virtual circuit being the working virtual circuit; and
causing to be dequeued a packet from one of the packet buffers associated with the working virtual circuit, the particular packet buffer being the packet buffer having the highest priority, as assigned by a Quality of Service policy function, of the plurality of packet buffers, the dequeued packet being associated with the working virtual circuit.

20. An apparatus for flow control in a network communications device, said network communications device receiving a plurality of packets, comprising:
a packet queue structure disposed to receive said plurality of packets and comprising a plurality of packet buffers;
a packet scheduler, operably connected to said packet queue structure, configured to dequeue each packet in said plurality of packets from said packet queue structure based on a packet hierarchy;
a packet segmenter disposed to receive said dequeued packets and configured to segment each said dequeued packet into ATM cells;
a cell queue structure operably connected to and receiving said ATM cells from said packet segmenter comprising a plurality of cell buffers, said cell buffers having a fill level characteristic;
a cell scheduler, operably connected to said cell queue structure, configured to dequeue said ATM cells from said cell queue structure based on said packet hierarchy, said cell scheduler comprising a first in, first-out (FIFO) module configured to schedule cells belonging to each said packet for dequeuing, preferentially in the order in which said cells were received; and
feedback circuit disposed between and operably connected to said cell scheduler and said packet queue structure and configured to provide one or more feedback signals corresponding to said packet hierarchy to said packet queue structure;

wherein:
said feedback circuit is controlled at least in part by said fill level characteristic of said cell buffers;
said one or more feedback signals are based on said virtual circuit characteristics and said virtual path characteristics of said plurality of packets; and
the packet scheduler is configured to dequeue each packet from said packet queue structure based on a packet hierarchy by:
determining which packet buffers contain a packet ready for dequeuing;
determining for each virtual circuit of a plurality of virtual circuits, each virtual circuit being associated with one cell buffer and with a plurality of packet buffers, if that particular virtual circuit is associated with a packet buffer containing a packet ready for dequeuing;
for each virtual circuit associated with a packet buffer containing a packet ready for dequeuing, determining if that virtual circuit has available capacity with reference to a feedback signal from the cell buffer associated with the virtual circuit;
determining which virtual circuit associated with a packet buffer containing a packet ready for dequeuing with available capacity has a highest virtual circuit priority, said virtual circuit being the working virtual circuit; and
causing to be dequeued a packet from a packet buffer associated with the working virtual circuit, the particular packet buffer being the packet buffer containing a packet ready for dequeuing having the highest priority, as assigned by a Quality of Service policy function, the dequeued packet being associated with the working virtual circuit.

21. A computer-readable medium storing a computer program executable by a network communications device, the computer program comprising computer instructions for:
enqueuing said packets in one or more packet queue structures;
scheduling said packets for dequeuing from said one or more packet queue structures according to a packet hierarchy;
dequeuing said packets;
segmenting each said dequeued packet into one or more ATM cells;
enqueuing said ATM cells into one or more cell queue structures;
scheduling said ATM cells for dequeuing from said one or more cell queue structures according to said packet hierarchy; and
transmitting said ATM cells through an ATM interface;

wherein:
said dequeuing said packets is controlled by the presence or absence of one or more feedback signals from said cell queue structures;
said scheduling said ATM cells for dequeuing from said one or more cell queue structures employs a first in, first-out buffer; and
the computer instructions for dequeuing said packets include computer instructions for:
determining which packet queue structures contain a packet ready for dequeuing;
determining for each virtual circuit of a plurality of virtual circuits, each virtual circuit being associated with one cell queue structure and with a plurality of packet queue structures, if that particular virtual circuit is associated with a packet queue structure containing a packet ready for dequeuing;
for each virtual circuit associated with a packet queue structure containing a packet ready for dequeuing, determining if that virtual circuit has available capacity with reference to a feedback signal from the cell queue structure associated with the virtual circuit;

determining which virtual circuit associated with a packet queue structure containing a packet ready for dequeuing with available capacity has a highest virtual circuit priority, said virtual circuit being the working virtual circuit; and causing to be dequeued a packet from a packet queue structure associated with the working virtual circuit, the particular packet queue structure being the packet queue structure containing a packet ready for dequeuing having the highest priority, as assigned by a Quality of Service policy function, the dequeued packet being associated with the working virtual circuit.

* * * * *

UNITED STATES PATENT AND TRADEMARK OFFICE
CERTIFICATE OF CORRECTION

PATENT NO. : 7,606,158 B2
APPLICATION NO. : 10/949916
DATED : October 20, 2009
INVENTOR(S) : Guy C. Fedorkow et al.

It is certified that error appears in the above-identified patent and that said Letters Patent is hereby corrected as shown below:

Claim 14, Column 17, Lines 32 - 35, "The computer-readable medium of claim 1, wherein said packet hierarchy is determined at least in part by a virtual circuit characteristic and a virtual path characteristic of each said packet" should read -- The computer-readable medium of claim 13, wherein said packet hierarchy is determined at least in part by a virtual circuit characteristic and a virtual path characteristic of each said packet --.

Claim 15, Column 17, Lines 36 - 38, "The computer-readable medium of claim 1, wherein at least one of said feedback signals is generated with an incremental algorithm" should read -- The computer-readable medium of claim 13, wherein at least one of said feedback signals is generated with an incremental algorithm --.

Claim 19, Column 18, Line 66, "feedback circuit disposed between an operably connected..." should read -- a feedback circuit disposed between an operably connected... --.

Claim 20, Column 19, Line 60, "feedback feedback circuit disposed between an operably connected..." should read -- a feedback circuit disposed between an operably connected... --.

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

PATENT NO. : 7,606,158 B2  Page 1 of 1
APPLICATION NO. : 10/949916
DATED : October 20, 2009
INVENTOR(S) : Fedorkow et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1370 days.

Signed and Sealed this

Fourteenth Day of December, 2010

David J. Kappos
*Director of the United States Patent and Trademark Office*